US007959505B2

(12) United States Patent
Duhamel

(10) Patent No.: US 7,959,505 B2
(45) Date of Patent: Jun. 14, 2011

(54) EVALUATION-STRUCTURE BASE GAME FEATURE PERSISTING OVER A NUMBER OF OUTCOMES

(75) Inventor: Gérald Duhamel, Drummondville (CA)

(73) Assignee: Labtronix Concept Inc., Drummondville (CA)

( * ) Notice: Subject to any disclaimer, the term of this patent is extended or adjusted under 35 U.S.C. 154(b) by 1048 days.

(21) Appl. No.: 11/602,996

(22) Filed: Nov. 22, 2006

(65) Prior Publication Data

US 2007/0270207 A1 Nov. 22, 2007

(51) Int. Cl.
*A63F 13/00* (2006.01)

(52) U.S. Cl. .......... 463/20; 463/16; 273/138.1; 273/139

(58) Field of Classification Search .......... 463/1, 10–13, 463/16–21, 23, 25–27, 29–34; 273/138.1, 273/138.2, 139, 141 A, 142 B, 142 C, 142 J, 273/148 R, 429–432; *A63F 13/00*
See application file for complete search history.

(56) References Cited

U.S. PATENT DOCUMENTS

| | | | | |
|---|---|---|---|---|
| 6,004,207 | A | 12/1999 | Wilson, Jr. et al. | |
| 6,179,711 | B1 * | 1/2001 | Yoseloff | 463/25 |
| 6,261,178 | B1 | 7/2001 | Bennett | |
| 6,419,579 | B1 | 7/2002 | Bennett | |
| 6,471,208 | B2 * | 10/2002 | Yoseloff et al. | 273/143 R |
| 6,561,904 | B2 | 5/2003 | Locke et al. | |
| 6,604,740 | B1 * | 8/2003 | Singer et al. | 273/292 |
| 6,612,927 | B1 * | 9/2003 | Slomiany et al. | 463/16 |
| 6,722,975 | B2 * | 4/2004 | Duhamel | 463/12 |
| 6,869,360 | B2 | 3/2005 | Marks et al. | |
| 6,932,702 | B1 | 8/2005 | Harris | |
| 6,984,173 | B1 * | 1/2006 | Piechowiak et al. | 463/20 |
| 7,056,214 | B2 | 6/2006 | Miereau et al. | |
| 7,494,413 | B2 * | 2/2009 | Singer et al. | 463/20 |
| 7,507,156 | B2 * | 3/2009 | Nicely | 463/25 |
| 7,604,538 | B2 * | 10/2009 | Pacey | 463/20 |
| 7,722,457 | B1 * | 5/2010 | Marks et al. | 463/20 |
| 2003/0073482 | A1 | 4/2003 | Baerlocher et al. | |
| 2003/0162585 | A1 | 8/2003 | Bigelow, Jr. et al. | |
| 2003/0220137 | A1 * | 11/2003 | Duhamel | 463/25 |
| 2004/0048646 | A1 | 3/2004 | Visonik | |
| 2004/0048652 | A1 | 3/2004 | Ching et al. | |
| 2004/0053683 | A1 | 3/2004 | Hartl et al. | |
| 2004/0087359 | A1 * | 5/2004 | Cuddy et al. | 463/20 |
| 2004/0092299 | A1 | 5/2004 | Gauselmann | |
| 2004/0176159 | A1 | 9/2004 | Walker et al. | |
| 2004/0229676 | A1 * | 11/2004 | Duhamel et al. | 463/16 |
| 2005/0014556 | A1 * | 1/2005 | Duhamel | 463/20 |
| 2005/0014557 | A1 * | 1/2005 | Duhamel | 463/20 |
| 2005/0037836 | A1 * | 2/2005 | Gilmore et al. | 463/25 |
| 2005/0101372 | A1 | 5/2005 | Mierau et al. | |
| 2005/0130737 | A1 | 6/2005 | Englman et al. | |
| 2005/0266917 | A1 | 12/2005 | Glavich et al. | |
| 2006/0068884 | A1 * | 3/2006 | Baerlocher et al. | 463/20 |
| 2006/0142077 | A1 * | 6/2006 | Miles et al. | 463/20 |

* cited by examiner

*Primary Examiner* — Arthur O. Hall
(74) *Attorney, Agent, or Firm* — Benoît & Côté

(57) ABSTRACT

Embodiments of the present invention provide methods, systems and programs for conducting game feature. A method comprises: a) upon generation of a game outcome, evaluating the game outcome according to a plurality of evaluation structures against a payout criteria set and a feature criteria set; b) for each evaluation of an evaluation structure that fulfills a payout criterion, calculating a payout value according to a feature attribute associated with said evaluation structure; c) for each evaluation structure having an associated feature attribute and that fulfills a feature criterion, modifying said feature attribute, said modified feature attribute persisting for calculating the payout value of at least one subsequent game outcome; and d) awarding the sum of the calculated payout values of all of the evaluation structures to a player. An embodiment involves a free-spin feature in which the feature attributes are multiplier values evolving and persisting throughout the free-spin feature.

17 Claims, 9 Drawing Sheets

EVALUATION-STRUCTURE BASE GAME FEATURE PERSISTING OVER A NUMBER OF OUTCOMES

CROSS-REFERENCE TO RELATED APPLICATIONS

This application claims priority under 35US§119(e) of U.S. provisional patent application 60/738,603, filed on Nov. 22, 2005, the specification of which is hereby incorporated by reference.

SUMMARY OF THE INVENTION

An embodiment of the present invention provides a method of conducting game feature. The method comprises the step of evaluating a game outcome according to a plurality of evaluation structures against payout criteria and feature criteria. The method further comprises, for each evaluation structure having an associated feature attribute for which the evaluation of the game outcome according to that evaluation structure fulfills the payout criteria, calculating a current payout value according to the feature attribute associated with that evaluation structure. The method comprises, for each evaluation structure having an associated feature attribute for which the evaluation of the game outcome according to that evaluation structure fulfills the feature criteria, modifying the feature attribute; that modification of the feature attribute is performed to persist for calculating the payout of a subsequent payout value according to a subsequent game outcome. The method also comprising awarding the sum of the calculated payout values of all of the evaluated evaluation structures to a player. The herein method is performed is such a manner to permit to the modified feature attribute to be used for calculating the current payout value or a subsequent payout value.

Another embodiment of the invention provides a method of conducting a game of chance comprising a plurality of evaluation structures and wherein a feature attribute is associated with an evaluation structure. The method comprises the step of evaluating a game outcome according to the pertinent evaluation structure against the feature criteria. The method comprises, when said feature criteria is fulfilled, modifying the feature attribute. The method further comprises applying the modified feature attribute: to evaluate the game outcome and a subsequent game outcome; to evaluate a subsequent game outcome; or to trigger a game feature in the game of chance.

Yet another embodiment of the present invention provides a method of conducting a game feature. The method comprises, upon generation of a game outcome, evaluating the game outcome according to a plurality of evaluation structures against payout criteria and feature criteria; and, for each evaluation structure for which the evaluation of the game outcome according to them fulfills the payout criteria, establishing a payout value. The method, for each evaluation structure having an associated feature attribute for which the evaluation of the game outcome according to that evaluation structure fulfills the feature criteria, further comprises at least one of: modifying the feature attribute with that modified feature attribute persisting over at least one subsequent game outcome; and providing a feature award according to the feature criteria and the current feature attribute. The method finally comprising awarding the payout values to the player.

Another embodiment of the present invention provides a gaming machine. That gaming machine comprises means for providing a game outcome according to a plurality of evaluation structures, storing means for storing payout criteria, feature criteria, and a plurality of feature attributes, and evaluating means for evaluating the game outcome according to the plurality of evaluation structures against at least one of the payout criteria and the feature criteria. The gaming machine comprises modifying means for modifying a specific one of the feature attributes in the storing means based on the evaluation of the game outcome according to a specific one of the evaluation structures against the feature criteria. The gaming machine further comprises awarding means for awarding a calculated payout to a player based on the evaluation of the game outcome according the evaluation structures and the feature attributes. The gaming machine is adapted in such manner than every feature attribute is individually associated with a specific one of the evaluation structures.

Another embodiment of the present invention provides a gaming system comprising a plurality of components. One of these components is means for providing a game outcome according to a plurality of evaluation structures. Another one is storing means for storing payout criteria, feature criteria, and a plurality of feature attributes. Another one is modifying means for modifying a specific one of the feature attributes in the storing means based the evaluation of the game outcome according to a specific one of the evaluation structures against the feature criteria. Another component consists in awarding means for awarding a calculated payout to a player based on the evaluation of the game outcome according to the plurality of evaluation structures and the feature attributes. The gaming system is adapted in such a manner than each one of the feature attributes is associated with a specific one of the evaluation structures.

A further embodiment of the present invention provides a computer program embodied on a computer readable medium or in a processor-readable memory having codes adapted for: a) evaluating a game outcome according to a plurality of evaluation structures against payout criteria and feature criteria; b) for each evaluation structure having an associated feature attribute for which the evaluation of the game outcome according to the evaluation structure fulfills the payout criteria, calculating a current payout value according to the feature attribute associated with the evaluation structure; c) for each evaluation structure having an associated feature attribute for which the evaluation of the game outcome according to the evaluation structure fulfills the feature criteria, modifying the feature attribute, the modified feature attribute persisting for calculating a subsequent payout value according to a subsequent game outcome; and d) awarding the sum of the calculated payout values of all of the evaluated evaluation structures to a player. The codes are adapted for the modified feature attribute to be used for calculating at least one of: i) the current payout value; and ii) the subsequent payout value.

BRIEF DESCRIPTION OF THE DRAWINGS

Further features and advantages of the present invention will become apparent from the following detailed description, taking in combination with the appended drawings, in which.

It will be noted that throughout the appended drawings, like features are identified by like reference numerals.

DETAILED DESCRIPTION OF THE EMBODIMENTS OF THE INVENTION

Figure 1:
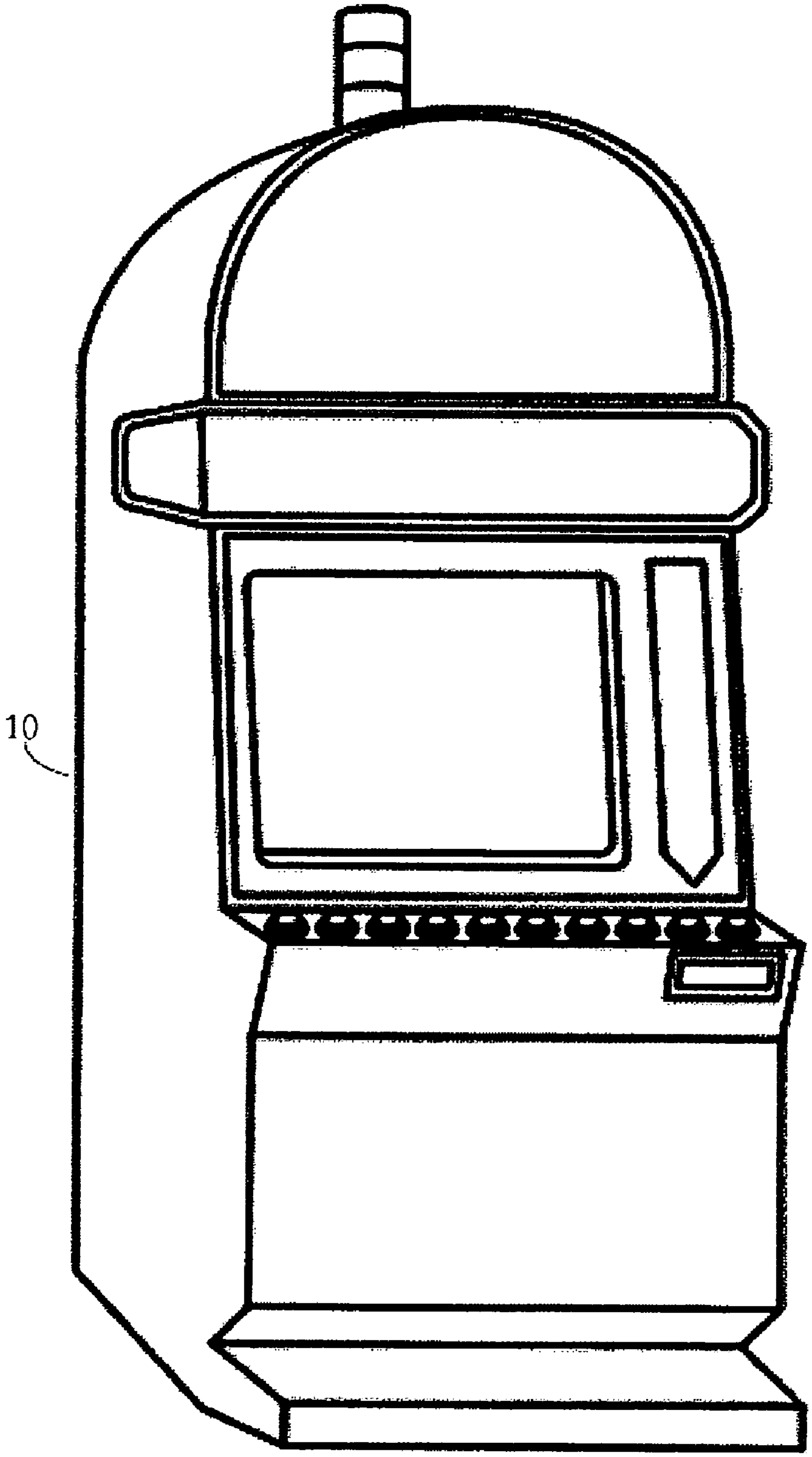
FIG. 1 illustrates a perspective view of a gaming machine suitable for embodiments of the present invention.

In order to provide a good understanding of the invention, in this application the terms "outcome" and "game outcome" mean "a plurality of indicia provided to the player according to a structure characteristic to the game or its game rules". For example, in a poker hand, the poker hand would be an array of cards, typically five, with the sequence of the cards not influencing its evaluation. In another example, a line game would provide a matrix of fifteen (15) symbols with the symbols being evaluated as ordered combinations of five (5) symbols.

The terms "attribute" and "feature attribute" refer to a characteristic or a property influencing a process. For example, the terms "feature attribute" may comprise a multiplier value influencing the valuation of an outcome in a game environment, or a trigger for a particular game feature.

In relation with the terms "attribute" or "feature attribute", terms such as "mathematical", "functional", "self-dependent" or "interactive" may be associated.

A mathematical feature attribute refers to an attribute having a mathematical nature or a mathematical influence on the game. For example, such a mathematical feature attribute may comprise a multiplier value influencing the payout awarded, or an instant value defining a payout to award based on fulfillment of an associated characteristic.

A functional feature attribute refers to an attribute having a functional relationship in the game, or with a game component for example. Examples of functional feature attributes may comprise the use of a particular state or value of a feature attribute as a trigger to participate in a particular feature, the feature attribute influencing the pay schedule, the conduct of the game, the probabilities in the game, or activating or deactivating criteria.

An interactive feature attribute refers to one having an interaction with an outside feature, or depending at least in part on other devices of the game environment. For example, the use of the feature attribute to trigger a specific game feature is deemed to be interactive. One feature attribute requiring inputs from a player or depending from a signal from a server for example are also deemed interactive.

In comparison with the above interactive feature attribute, a self-depending attribute refers to one feature attribute that is auto-driven, one not influenced by or not influencing by other features of the game else than the payout.

The terms "evaluation structure" refer to "a structure on which is based the evaluation of a game outcome". It therefore refers to a sub-structure of the game stricture, which is used to evaluate a sub-set of the game indicia forming the game outcome, with the evaluation being performed based on a pay schedule of other criteria according to the game rules. An example of an evaluation structure is a pay-line configuration in a five-reel line game, wherein the pay-line configuration consists in an order configuration of locations, one per reel, identifying symbols being evaluated against symbol combinations to evaluate the pay line.

The term "criteria" refers to "a rule or principle used in the testing of" or "a condition that may be fulfilled". Therefore, criteria may involve a comparison to a list of comparison values, combinations, etc., the testing of a predetermined number of conditions, etc. For example, fulfilling criteria in a line game may include the occurrence of a symbol combination matching one symbol combination present in the pay schedule, the occurrence of a symbol combination matching none of the symbol combinations present in the pay schedule, having a value at least equal to a predetermined value, or fulfilling a predetermined number of conditions. It has in consequence to be understood that criteria is met to have the possibility to encompass any comparison parameter or set of such comparison parameters according to the circumstances.

The terms "persisting" and all of its related words relates to the notion of "remaining in a current state" or "passing through" wherein the notion is applied in reference to the conduct of a plurality of plays, each defined as a single outcome of the game. For example, a value persisting over a number of outcomes means that this persisting value will not being re-established from scratch with the occurrence of each outcome but will remain steady when a new outcome will be defined.

The terms "primary game", "bonus feature", and "free spin feature" relates to different states or modes the game may pass through. For example, primary game is the game in which wagers are accepted in a wagering game. Bonus feature and free spin feature are special modes, usually provided following the occurrence of a triggering event in the primary game, in which the payout mode is usually changed in a payout mode that is more favourable for the players.

The terms "activating", "initiating", "deactivating" and "ending" are related a punctual feature having a start and an end. Therefore, the punctual feature begins, remains active during a time period, and ends. An example of such a punctual feature is a second screen bonus feature triggered during the play of a primary game.

Figure 2:
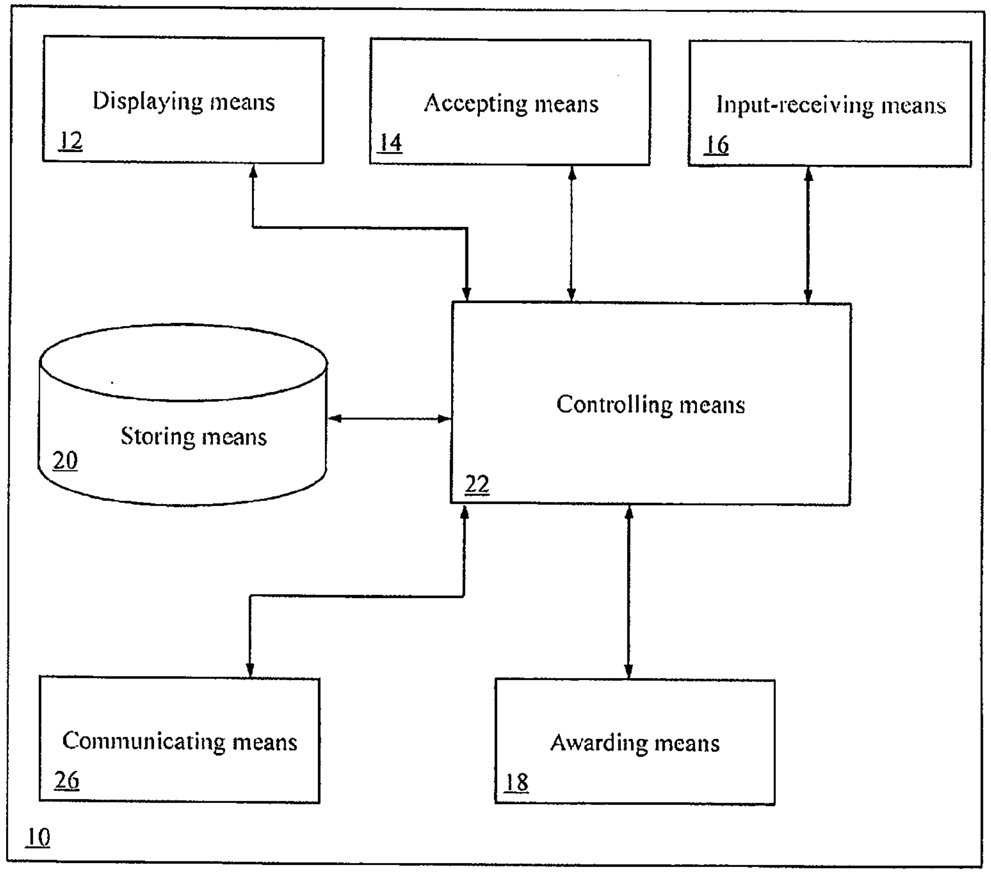
FIG. 2 is a block diagram illustrating the components of the gaming machine of FIG. 1.

An embodiment of the present invention may be carried out in part on a gaming machine, as illustrated on FIGS. 1 and 2. The gaming machine 10 comprises displaying means 12, such as a video screen or a LCD screen; accepting means 14, such as a card reader, a ticket reader, or a coin and/or bill acceptor; input-receiving means 16, such as buttons, levers or a touch screen; awarding means 18, such as a ticket printer, a card reader or a hopper; storing means 20, such as RAM, flash memory, a hard drive or a removable memory medium; and controlling means 22, such as a computer, computer codes, or a hardware controller. Gaming machine 10 comprises communicating means 26, such as a network communication controller and a network connection, or a wireless communication capability. In another embodiment, the gaming machine 10 carrying out the invention may comprise, either in replacement of or in combination with the accepting means 14, communicating means 26 allowing communication between the controlling means 22 and remotely linked accounting means (not shown) wherein player accounts are maintained (either by a casino or by a financial institution, such as a bank), and monetary value is downloaded on the gaming machine 10 to play the game and uploaded on the accounting means upon quitting the game.

Figure 3:
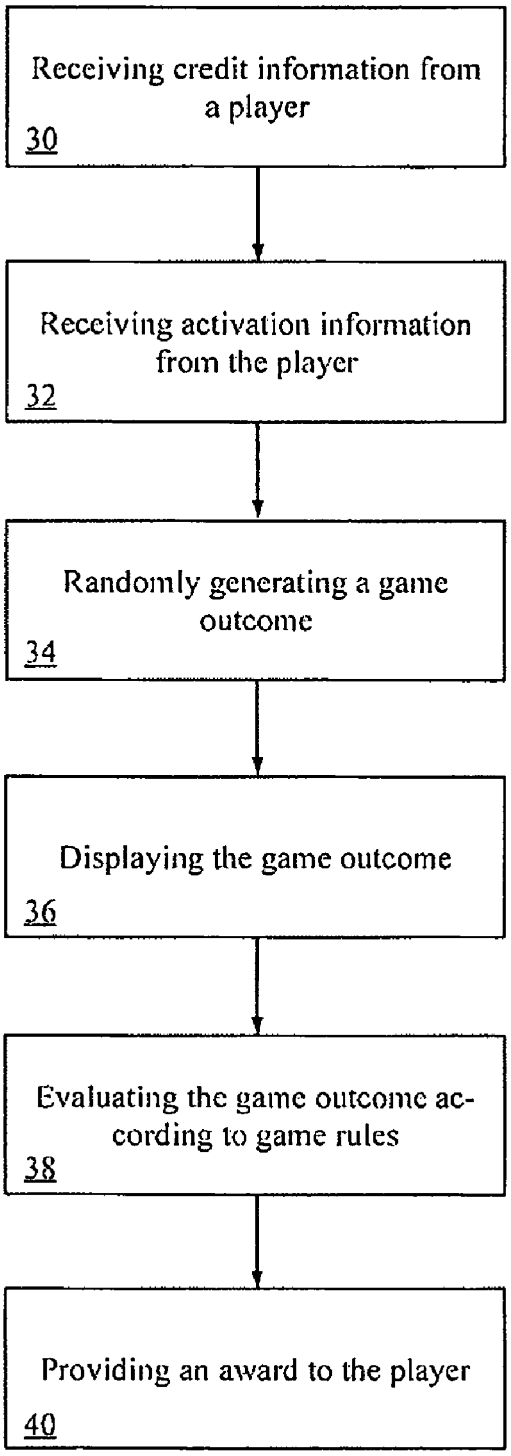
FIG. 3 is a flow chart providing the steps performed by a gaming machine while playing a game according to an embodiment of the present invention.

Such a gaming machine 10 is designated, as shown on FIG. 3, to provide a player with a participation in a wagering game. Such a game participation involves receiving credit information from a player (at step 30) coming from the deposit of money either in a physical format (such as coins or bills) or in an electronic format (such as money stored on a player card or transfer from a bank account), receiving activation information from the player (at step 32), randomly generating (at step 34) and displaying (at step 36) a game outcome, evaluating the game outcome according to game rules (at step 38), and providing the player with the award(s) corresponding to the evaluated outcome (at step 40). Depending on the evaluated outcome, the award may comprise a prize, the initiation of a feature, or the participation of a special feature such as a bonus feature or a tournament.

Figure 4:
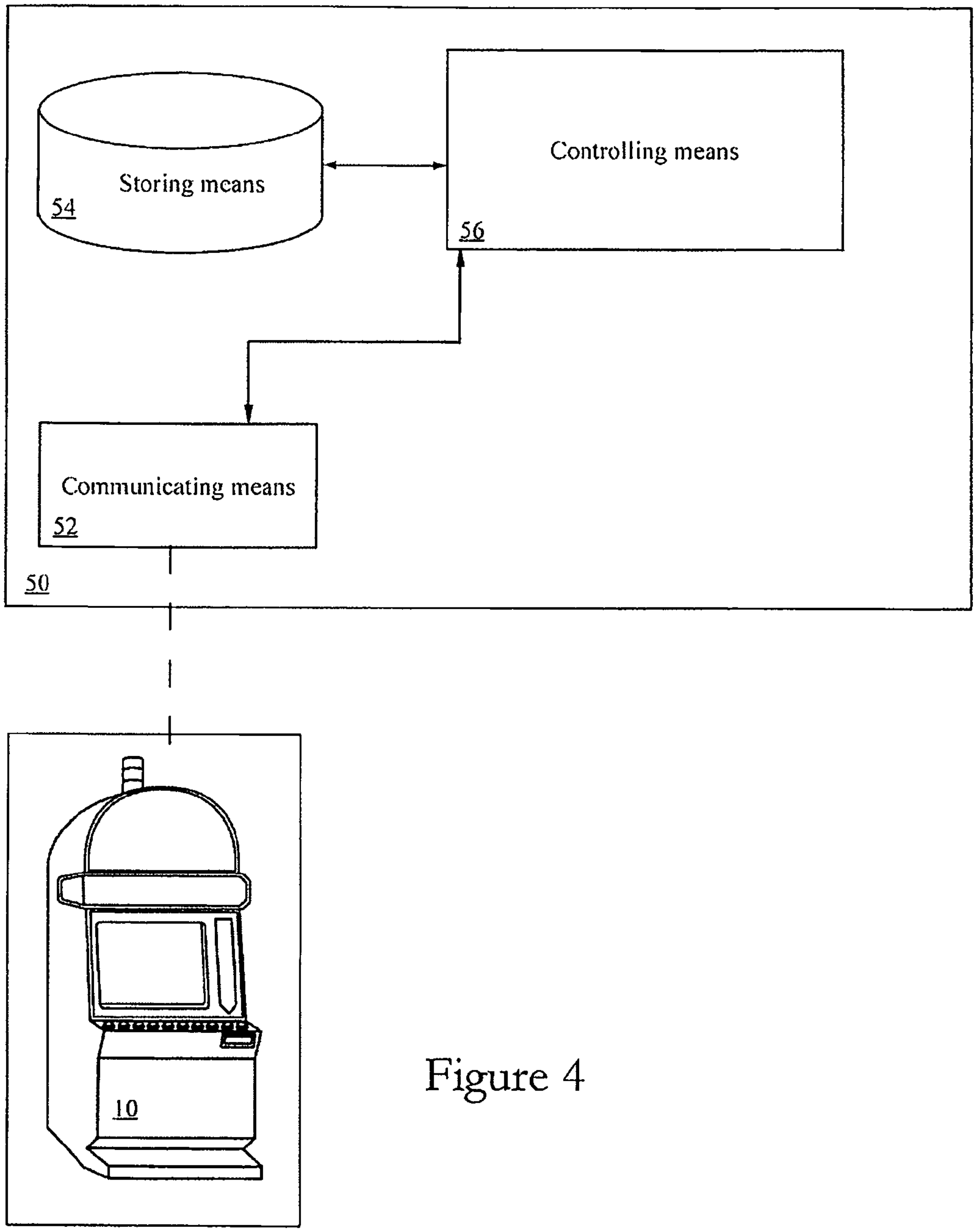
FIG. 4 is a block diagram illustrating the components of a gaming system suitable for embodiments of the present invention.

Depending on the desired configurations, the game, the monitoring needs, etc., a gaming system, as illustrated on FIG. 4, may be involved in providing participations in a wagering game. The gaming system would comprise a plurality of gaming machines 10; communicating means 52, such as a network communication controller, and a network connection or a wireless communication capability; and a game server 50. The latter would comprise storing means 54 such as RAM, flash memory, a hard drive, or a removable memory medium; and controlling means 56 such as a computer, computer codes, or a hardware controller. The game server 50 would be responsible to perform at least one of managing players' accounts; generating outcome; signalling gaming machines 10 in regard of feature to provide; managing a progressive prize system; operating a player tracking program; providing security controls; etc.

According to embodiments, a gaming machine alone or a system comprising a gaming machine may be necessary to provide embodiments of the invention, with some functions necessary to the invention to be embodied being performed by one or another component of system.

Alternative embodiments of the invention comprise computer programs embodied on a computer readable medium or in a processor-readable memory having codes adapted to conduct methods embodying the invention. The alternative embodiments are also intended to be protected as they fall into the spirit and scope of the invention.

As one embodiment of the invention, a method of conducting a free spin feature in relation with a wagering game is provided.

Figure 5:
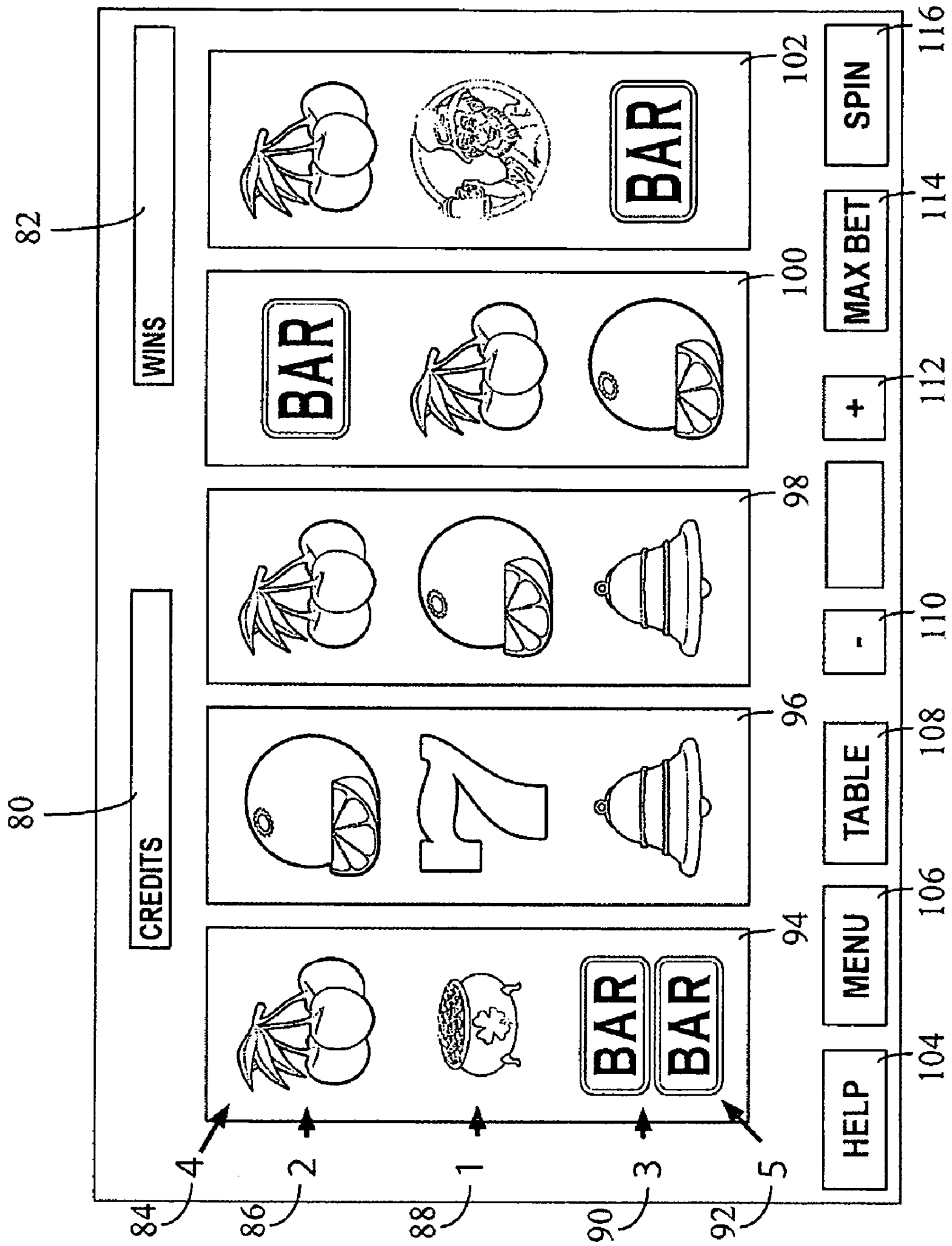
FIG. 5 is a schematic illustration of the game interface used in providing a line game according to an embodiment of the invention.
Figure 6A:
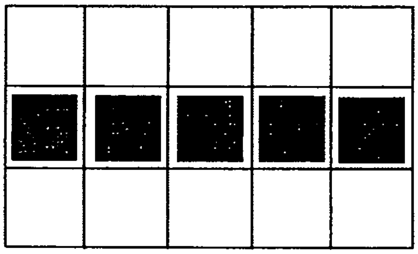
FIGS. 6*a* through 6*e* illustrate different evaluation structures in the line game of FIG. 5.
Figure 6B:
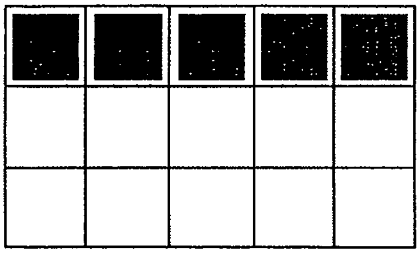
Figure 6C:
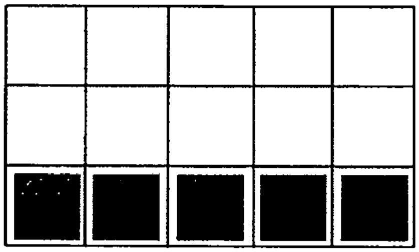
Figure 6D:
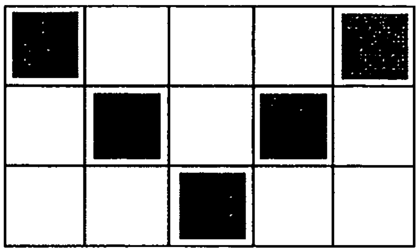
Figure 6E:
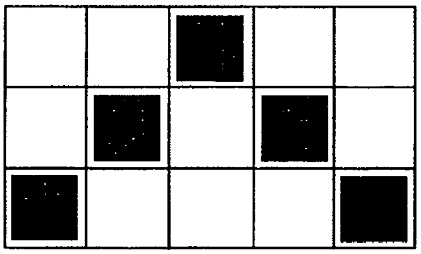

FIG. 5 illustrates the wagering game structure of a five-line game, an example of the above embodiment. The game structure comprises a) five (5) reels 94, 96, 98, 100 and 102 each bearing three (3) visible symbols participating in the outcome which results in a matrix of fifteen (15) symbols; b) five (5) pay lines 84, 86, 88, 90 and 92 each having a numerical identification and an associated evaluation structure; c) a credit counter 80 providing the current credit amount of the player; d) a win counter 82 providing the prize resulting from the current play; and e) soft controls 104, 106, 108, 110, 112, 114, and 116 allowing the player to perform some actions in the game, for example setting the bet value, accessing help displays, and initiating a play of the game.

FIGS. 6*a* through 6*e* illustrate the five (5) evaluation structures. According to each one of these evaluation structures, the symbols of the game outcome produces a five-symbol combination which is evaluated, in the present game, from left to right. In the present game, combinations may results in wins if they produce a continuous sequence of at least two (2) or three (3) particular symbols according to a symbol evaluation schedule. A prize value is awarded based on the value of the evaluated combination.

In an example of the above line game, a line game is played using the game structure above-described. Accordingly, the player place a wager and symbols are randomly determined to for the game outcome. The outcome is evaluated based on the active pay lines, and the player is awarded the outcome value.

In the above example, upon the evaluation of a triggering outcome in the game, a free spin feature starts. Practically, when three (3) or more Leprechaun symbols are scattered among the fifteen-symbol outcome, the free spin feature is initiated. Depending on the number of activate pay lines, the wager value, and the number of Leprechaun symbols forming the triggering outcome occurred, one (1) to (3) pay lines are activated for a free spin feature lasting from five (5) to twenty (20) spins.

Figure 7:
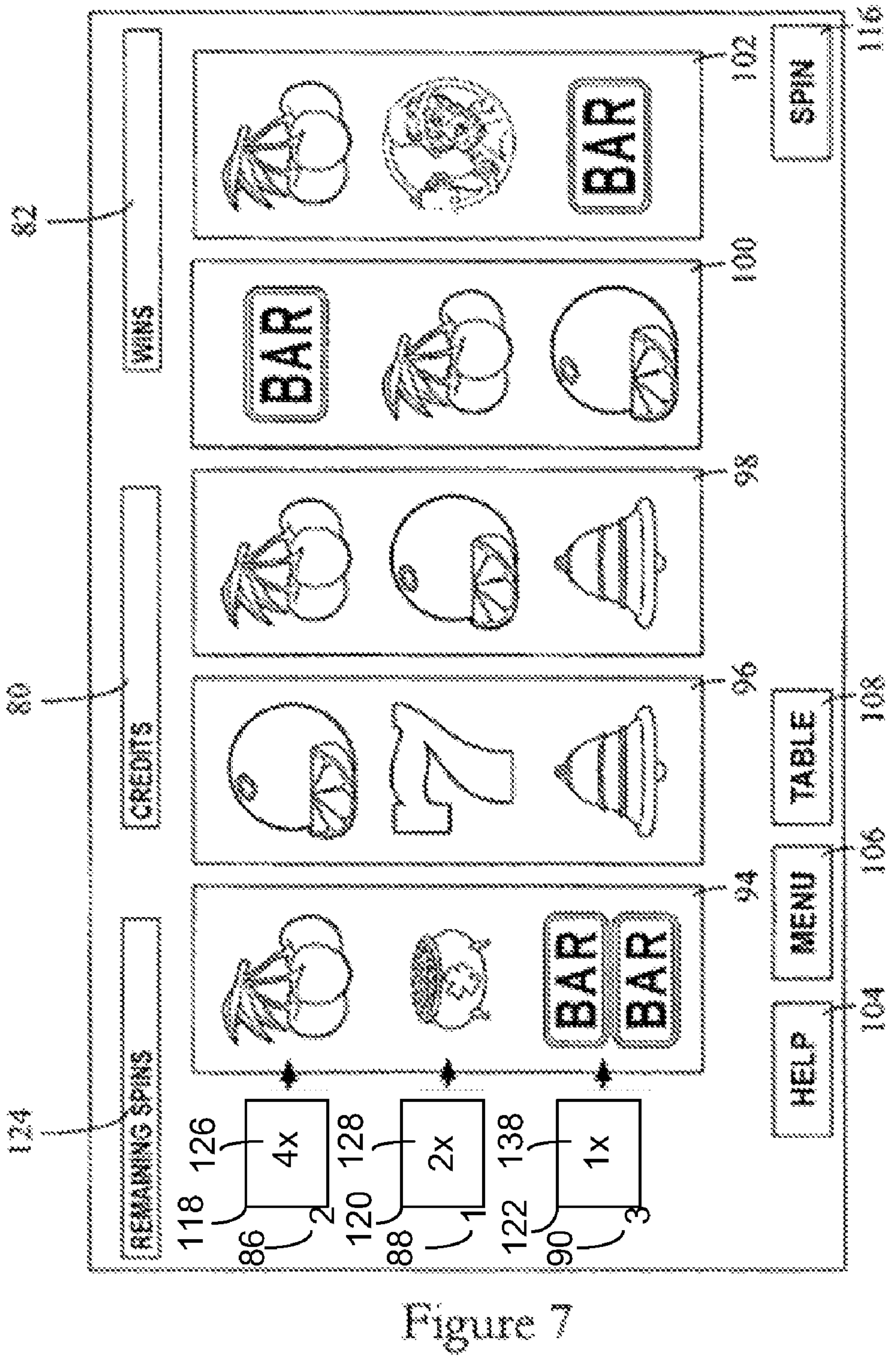
FIG. 7 is a schematic illustration of the game interface of the same game as the one with its game interface being illustrated on FIG. 5 once the line game of FIG. 5 has initiated a free spin feature.

FIG. 7 illustrates the game structure during the free spin feature. Some soft controls 104, 106, 108 and 116 remain active. New attribute windows 118, 120 and 122 in which feature attributes 126, 128 and 138 respectively appear, are disposed beside the identification of the three pay lines Pay Line "1" 88, Pay Line "2" 86, and Pay Line "3" 90. A Countdown window 124 displays the number of spins remaining in the feature. At the beginning of the feature, all attribute windows 118, 120 and 122 provides a one-time (1×) value. FIG. 7 illustrates an example of the game structure during the free spin feature (i.e., at a certain point in the feature after the feature has begun) wherein the attribute windows 118, 120 and 122 respectively show feature attribute 126 as a four-time (4×) value, feature attribute 128 as a two-time (2×) value, and feature attribute 138 as a one-time (1×) value.

Figure 8:
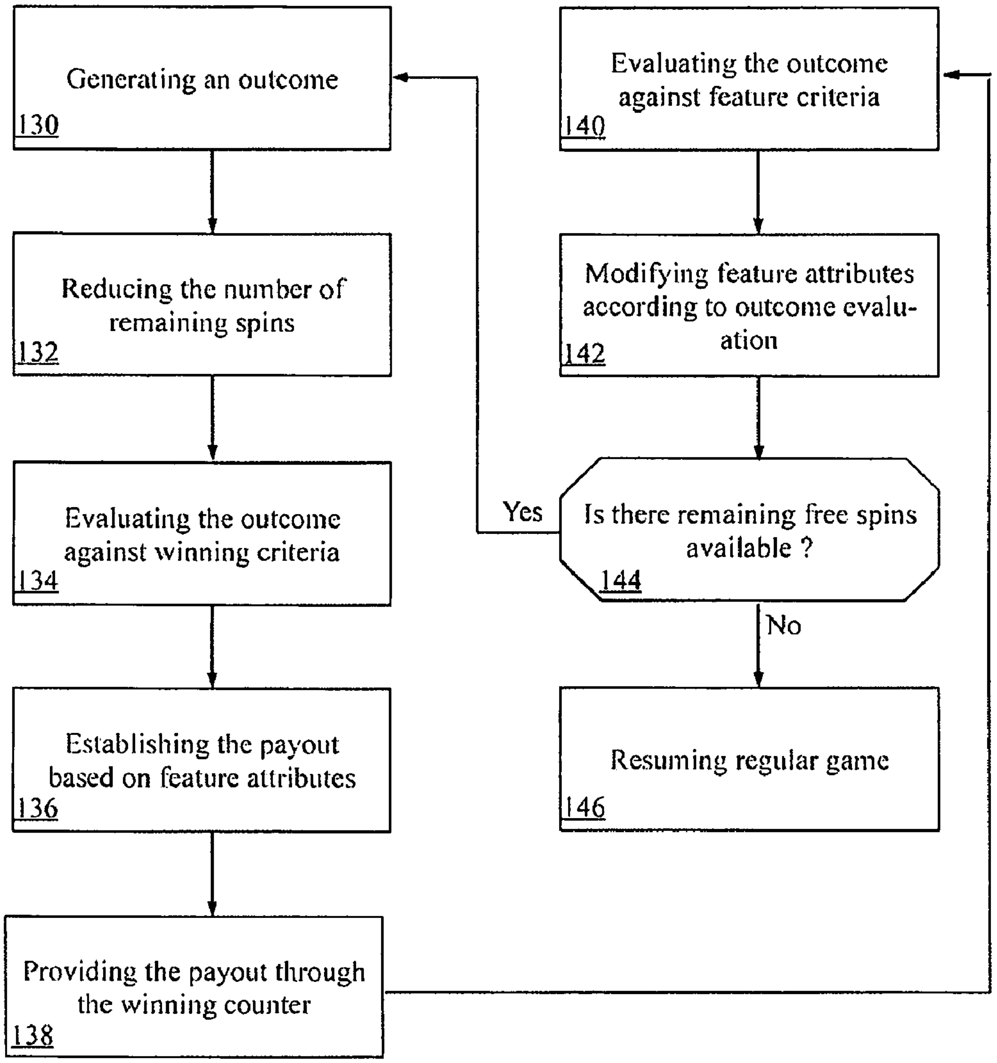
FIG. 8 is a flow chart illustrating the steps performed while conducting the free spin feature using the game interface illustrated on FIG. 7.

The conduct of the free spin feature is performed as illustrated on FIG. 8. For each free spin, the reels spin and stop to generate a new outcome (at step 130) with a reduction of the remaining free spins (at step 132); the outcome is evaluated to determine if winning criteria are fulfilled according to active pay lines (at step 134); win prizes are calculated based on current pay line attribute value (at step 136) by multiplying the normal win value of the symbol combination by the current attribute value of the pay line associated with the evaluated evaluation structure; and placed in the win counter (at step 138); the pay lines outcomes are evaluated against feature criteria being a winning outcome (at step 140) with pay lines which are evaluated to fulfill a feature criterion seeing their associated attribute value being accrued (at step 142); and an evaluation to determine if the feature should end based on the number of remaining free spins is performed (at step 144). If there are remaining free spins, the feature resumes at step 130. Else, the bonus feature ends and the regular game is resumed (at step 146). Therefore, as wins are evaluated in association with a pay line, the attribute value of that pay line increases and, in consequence, the potential win value of a subsequent win on that pay line also increases. Furthermore, attribute values of pay lines increase independently from each other, which result in a feature providing more incentive regarding some pay lines that others as an attribute values increase faster than another.

In a different version of the above embodiment, the modification of the feature attribute values takes place before the determination of the prize values to award. Accordingly, when a pay line sees, during a single spin, its feature attribute being increased and its pay-line outcome being evaluated as a win, the prize value awarded for that pay-line outcome is based on the modified feature attribute value rather than the one present at the generation of the current game outcome.

According to another embodiment, upon initiation of a free spin feature, the feature takes place in two (2) phases: a feature-attribute establishing phase, and a prize determination process.

During the first phase lasting for three (3) spins in the present example, the symbols are replaced win numbers varying from zero (0) illustrated as a blank symbol, to five (5), and a Reset symbol. For each spin of the first phase, the feature attributes of each pay line increase based on the values occurring on their respective evaluation structure. For example, if a Three (3) symbol appears on the central location of the left reel, a One (1) symbol on the bottom location of the third reel, and a Reset symbol on the top location of the fourth reel, the feature attributes are modified as follows: the feature attribute associated with the top pay line is reset to One (1), the feature attribute associated with the central pay line is increased on three (3) units, and the bottom feature attribute is increased of a single unit.

During the second phase, regular symbols take back their place on the reels. Five (5) additional free spins are conducted. The winning prize values awarded for winning combinations, during the second phase, are based on the value of the feature attribute of the corresponding pay line at the end of the first phase.

According to another embodiment, upon occurrence of a triggering outcome or upon reception of a triggering signal from a networked server, a line game is modified to display an attribute window aside at least one, which is, in the present example, a single pay line (Pay Line 1) of the plurality of pay lines of the game. Each time a win is evaluated in association with Pay Line 1, the prize value awarded is based on its current multiplier value. Each time a special symbol, a Sun symbol, appears among the locations of the evaluation structure 1 (the evaluation structure associated with Pay Line 1); the attribute value accrues of a unit. The attribute value resets to one (1), which is illustrated by the attribute window disappearing, when the attribute value increases over 10, or when the player lowers his current wager level.

According to another embodiment, in a Leprechaun-theme line game, upon occurrence of a triggering outcome when the game is played at maximum bet, a feature begins. During this feature, three attribute windows appear aside the three first pay lines with initial values of one (1). Each time a Leprechaun symbol appears in the outcome, one pay-line attribute value increases of one (1) based on of the Leprechaun symbol in the pay-line outcome. In a similar fashion, each time a Leprechaun-Cauldron symbol appears in the outcome, one pay-line attribute value increases of five (5). Each time a win is evaluated on a pay line, the prize awarded is based on the current attribute value of the Pay Line. As Leprechaun symbols take place in outcomes, the attribute values increase non-homogeneously. The feature ends with the first one of: i) the player decreasing the bet value under the max bet threshold, and ii) any one of the attribute values reaching a limit threshold, in this case ten (10). Following the end of the feature, the attribute windows are removed from the game display.

Figure 9:
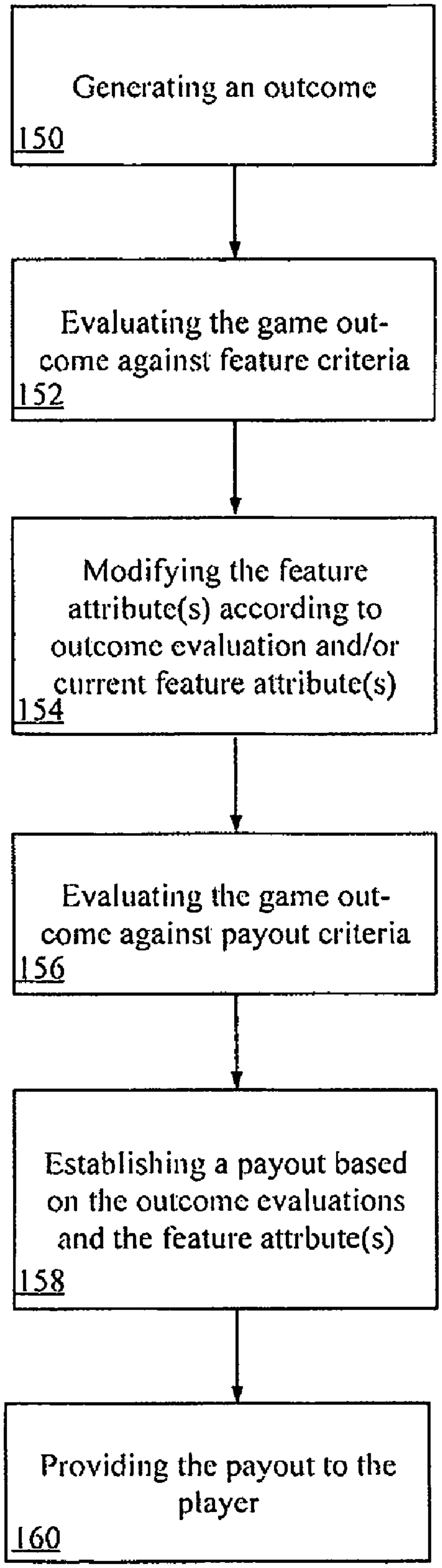
FIG. 9 is a flow chart illustrating the steps performed for conducting a game according to another embodiment of the present invention.

FIG. 9, through a flow chart, illustrates steps performed to provide the above embodiment. First, an outcome is generated (at step 150) and provided to the player using the game structure. Afterwards, the outcome is evaluated against feature criteria (at step 152), with a modifications of the feature attributes being performed (at step 154) based on the previous evaluation. This modification of the feature attributes, according to the present embodiment, may take the form of activating a feature attribute, deactivating of a feature attribute, increasing the value of a feature attribute. However, in other embodiment, modifying a feature attribute may take other forms as described in relation with these embodiments. Once the process of modifying the feature attributes complete, an evaluation of the game outcome against payout criteria is performed (at step 156), followed with the determination of the payout to provide to the player (at step 158) based on the game outcome evaluations (performed at steps 152 and 156) and parameters to apply based on the current feature attributes. Finally, the player is awarded this payout (at step 160).

In another embodiment, the attribute windows are displayed aside the indicators of Pay Line 1, Pay Line 2, and Pay Line 3. Depending on the wager level place d by the player, some of them may be turned inactive. In the present embodiment, when one of the Leprechaun or the Leprechaun-Cauldron symbol appears in a pay line outcome associated with an active feature attribute, the attribute is modified. When a winning outcome is monitored on one such pay line, the outcome value is multiplied by the current attribute value to establish the payout to award, and the feature attribute is reset to its base value: two (2). Thus, an increase of the attribute, which occurs upon the occurrence of a Leprechaun symbol in a pay line outcome, participates in a single payout.

In another embodiment, an on-going game feature use the same game structure and Leprechaun symbol that are described above. In this embodiment, three (3) feature attributes are simultaneously active, with their values increasing as Leprechaun symbols appear on their respective pay lines. Thus, three (3) multiplier values increases independently from each other. These multiplier values are used to increase the value of a winning combination on their respective pay lines. However, when a winning combination of four (4) or five (5) identical symbols occur on any of three (3) feature-attribute associated pay lines, the value of the three (3) feature attributes are reset. Though, as the more time it takes before a four (4) or five (5)-symbol winning combination to occur, the higher increases the feature attributes.

According to another embodiment using a similar theme as the above Leprechaun-theme game, the same two Leprechaun symbols are used. The Leprechaun-Cauldron symbol either initiates the feature in association with one pay line, or ends the feature in association with that pay line based on whether the feature is currently active in association with a pay line and where the symbol appears in the pay-line outcome. The regular Leprechaun symbol for its part has a role of accruing the attribute value when a feature is in progress on the pay line associated with the Leprechaun symbol position in the outcome. In consequence, based on the appearance of the Leprechaun-Cauldron symbol in outcomes, from none to a maximum of three (3) attribute values may modify the prizes to award to the players. These attribute values may increase independently from each other, and may increase to different values, providing the player with a non-homogeneous persisting feature.

According to another embodiment, a different game structure is described to provide a bonus feature upon occurrence of a triggering outcome in a primary game. In this example, a multi-hand poker game is played for five (5) rounds. The game is conducted as follow. The player receives fifteen (15) cards disposed in three (3) hands at the beginning of each round. For each of these hands, the player decides which cards to hold and the non-held cards are replaced to obtain three (3) final hands. The final hands are resolved by evaluating the final hands against a point schedule. Points are awarded to the player according to the hand ranking. The hand ranking also determines a modification of the attributes associated with each of the hands. The original attribute is one time (1×) value. The attribute increases with the number of cards of hearts in them: three cards increase the attribute of a single (1) unit; four cards increase the attribute of two (2) units; and five cards increases it of four (4) units. In consequence, the points the player will be awarded will vary for the same hand as the game progresses. For each winning final hand, the hand value in points is multiplied by the current attribute value associated with the hand to determine the number of points to award to the player. At the end of the five (5) rounds, the sum of the point values awarded to the player is compared with a pay schedule to determine the prize value won by the player.

According to another embodiment, a feature uses the present feature attribute values as parameters for determining the participation of the player in the feature. For this example, gaming machines providing the game are equipped with three (3) reels bearing symbols and three (3) pay lines based on which the reel borne symbols are evaluated. A feature display is disposed above the reels. For the example, the game presents a car-race theme. The wager level the player may place vary from 1 credit on the center pay line to five (5) credits on each pay line. Based on the setting of the wager level by the player, from one (1) to three (3) feature-attribute windows, disposed aside the pay line indicators, are set active, with the attributes set inactive following a change in the wager level being reset. The feature attribute windows provide race-cup icons evolving each time a Tool symbol appears in an outcome based on the position of that Tool symbol. Upon occurrence of a particular pay line outcome (a combination of race cars being used as wild symbols when not in that combination); the feature is initiated on the feature display wherein an animation of a race is provided. Prior to the animation, the player selects characteristics of his race car according to the current value of the race cup icon associated with the triggering pay line. The race is performed, and the player is awarded a bonus prize according to its race ranking, Afterwards, the race-cup icon is reset, and the primary game is reactivated.

In a networked version, the race-cup icons are accrued to gradually reach a participation level to a networked feature. For example, the race-cup icons may take many values, from Red (3, 2, 1) to Yellow (3, 2, 1) to Green, wherein the numbers (3, 2, 1) refer to counter values. When reaching a Green value, the player acquires a right to participate in a networked feature to come. Upon occurrence of a triggering outcome (three (3) race car symbols) on any networked gaming machine, the triggering gaming machine and all of the other networked gaming machines where were acquired a participation right initiate the bonus feature on their feature display. One race car is associated with each of the participants. A race begins. At the finish line, based on the ranking of their race car in the race, each player receives a bonus prize. Prior or following the race, the race-cup icons that were used to provide participation rights in the network feature are reset.

According to another embodiment, the persisting feature is associated with instant wins not available when the feature is not initiated. Upon the initiation of the feature, an instant prize is awarded for a symbol based on the pay line identified symbol. Example: upon occurrence of trigger symbol in a pay line outcome, an attribute window opens aside the pay line indicator. A symbol, a value and a life span, monitored through a counter, are selected (each 7 symbol pays three (3) credits during the next five (5) spins). Afterwards, for each following of the five next spins, a player is provided a number of credits for each occurrence of the symbol in the pay line outcome. If the trigger symbol reappears on a feature-active pay line, a new symbol is set to replace to old one, the value may also be modified, and the number of spins accrues the remaining number of spins (example: the 7 symbol being replaced with a Bar symbol, the value passing from three (3) to five (5) credits, and the number of spins increasing to ten (10) since two (2) spins were remaining and the number of spins selected being eight (8)).

In another embodiment using a line game structure, feature windows are disposed left from the far-left reel. According to feature criteria that are fulfilled, the feature windows bear none or one symbol which is combined with the game outcome to establish modified pay line outcomes composed of six (6) symbols beginning with the symbol displayed in the feature windows. Both the regular pay-line outcome and the modified pay-line outcome are evaluated, with the one having the highest payout establishing the payout to award to the player. For, example, if the feature windows associated with a pay line bears a Bar symbol, and the regular pay-line outcome of this particular pay line is composed in order of a Bar symbol, a Bar Symbol, a Star symbol, a 7 symbol and a Cherry symbol, the player will receive the payout corresponding to a combination of three (3) Bar symbols. In comparison, if the feature window still bears a Bar symbol, and the pay-line outcome is composed in order of three (3) Cherry symbols, a Bar symbol and a 7 symbol, the payout will be established based on a combination of three (3) Cherry symbols.

As described, many ways or tools are available to control the payout associated with the present game feature. They comprises: i) associating different level of activations (the number of feature attributes being active at the same time) according to the wager level; ii) providing a triggered game feature, with the probabilities of occurrence of the triggering event being established accordingly; iii) controlling the duration if the game feature or the feature attribute (free spins, limit value for a feature attribute, triggers ending the game feature, etc.); and iv) controlling the payout enhancement associated with the game feature (example: the level of increase of the attribute value). According to these parameters, the game feature may present many variations from one game in which the game feature is implemented to another implemented game.

According to the game environment, feature attributes or any other states regarding the present game feature may be processes as assets. For example, a player may store this asset in a player account before ending his game session. When playing a subsequent game session, through his identification, the player may retrieve this asset to take advantage of it in the current game session. For example, if the asset consists in an acquired right to participate in a particular feature upon occurrence of a triggering event, the player may store this asset if no triggering event occurred before he ended his previous game session.

Those skilled in the art may recognize other embodiments and/or methods to provide such functionalities. It will be noted that the described embodiments illustrate different characteristics the invention may present. Those skilled in the art will recognize that, even if the instant embodiments describe these characteristics as part of different devices, one could differently use or combine some of these characteristics without departing from the scope of the invention as intended to be set. Furthermore, non-described embodiments may also present other characteristics and/or variations, with such characteristics falling within the scope of the invention, as set forth in the appended claims.

Thus, it is the intent through the instant document to efficiently teach the invention through embodiments, while defining the scope of the invention solely through the appended claims.

The invention claimed is:

1. A method of conducting a game feature on a gaming machine comprising the steps of:

a) generating a game outcome on the gaming machine comprising:

i—a game structure defining a plurality of locations;

ii—a plurality of symbols, each symbol being disposed in one of the locations according to the game structure;

iii—two or more evaluation structures used to evaluate the game outcome and to establish payout values each individually associated with one of the evaluation structures;

iv—each evaluation structure, distinct from the other evaluation structures, being individually associated with a subset of the game structure locations; and v—one or more feature attributes each individually and separately assigned to a respective one of the evaluation structures, the feature attributes persisting over one or more subsequently-generated game outcomes;

b) evaluating the game outcome comprising:

i—evaluating the game outcome against payout criteria, comprising:

a—identifying two or more evaluation structures for use in evaluating the game outcome against payout criteria, defining two or more payout-evaluated structures;

b—for each of the two or more payout-evaluated evaluation structures, evaluating the game outcome against payout criteria based on the subset of locations associated with the two or more payout-evaluated evaluation structures;

c—for each positive evaluation, establishing the payout value associated with the payout-evaluated evaluation structure; and d—for each evaluation structure associated with one of the feature attributes, modifying the payout value according to the feature attribute assigned thereto;

and ii—evaluating the game outcome against feature criteria different at least in part from said payout criteria, comprising:

a—identifying one or more evaluation structures among the one or more evaluation structures having a feature attribute assigned thereto to be used to evaluate the game outcome against feature criteria, defining one or more feature-evaluated evaluation structures;

b—for each of the one or more feature-evaluated evaluation structures, evaluating the game outcome against feature criteria based on the subset of locations associated with the one or more feature-evaluated evaluation structures; and c—for each positive evaluation against feature criteria, modifying and replacing the feature attribute assigned to the feature-evaluated evaluation structure, the modified and replaced feature attribute persisting over one or more subsequently-generated game outcomes;

and c) awarding the payout values established during the step of evaluating the game outcome to the player on the gaming machine.

2. The method of claim 1, further comprising:

conducting a primary game in which a primary game outcome is generated in response of a wager from said player;

evaluating the primary game outcome against triggering criteria; and upon said triggering criteria being fulfilled, initiating a bonus feature persisting over a plurality of game outcomes, playing the bonus feature comprising performing the steps of generating a game outcome, evaluating the game outcome and awarding a sum of payout values according to claim 1.

3. The method of claim 2, wherein said feature attributes persist until the end of the bonus feature.

4. The method of claim 1, wherein said feature attribute is a multiplier value, with the step of modifying the payout value according to the feature attribute associated with an evaluation structure comprising:

calculating the product of:

i) the payout value established for the evaluation structure based on the evaluation of the game outcome according to the evaluation structure against the payout criteria, and ii) the multiplier value of one of:

a current feature attribute associated with said evaluation structure; and the modified feature attribute associated with said evaluation structure.

5. The method of claim 1, wherein the number of evaluation structures having feature attributes associated therewith is at least two.

6. The method of claim 5, wherein at least two of said evaluation structures have feature attributes associated therewith, the feature attributes being modified independently from each other.

7. The method of claim 5, wherein one of said feature attributes achieving a monitored state influences another of said feature attributes.

8. The method of claim 1, wherein said payout criteria and said feature criteria are identical.

9. The method of claim 1, further comprising:

receiving a wager value from the player; and establishing the evaluation structures to be evaluated based on said received wager.

10. The method of claim 1, further comprising:

receiving a wager value from the player; and establishing the evaluation structures to have a feature attribute associated therewith based on said received wager.

11. The method of claim 1, further comprising the steps of:

associating individually with each of the feature attributes a counter having a counter value;

upon occurrence of a monitored event according to an evaluation structure having a feature attribute associated therewith, modifying the counter value associated with the feature attribute;

evaluating the counter values against an exhaustion value; and upon evaluation of the counter value associated with one of the counters reaching the exhaustion value, deactivating at least the feature attribute having said counter associated therewith.

12. The method of claim 11, wherein the monitored event is the generation of one said game outcome; and the step of modifying the counter value comprises decreasing the counter value of a single unit, therefore providing a countdown.

13. The method of claim 1, further comprising:

monitoring a parameter using a counter in association with said feature attribute, therefore generating a counter value; and modifying said feature attribute when the counter value associated therewith fulfills a counter criteria.

14. The method of claim 1, wherein said payout value calculated according to a feature attribute comprises one of:

a credit value;

a participation in a special feature;

a participation right to a special feature; and an asset applicable in a process to take place.

15. The method of claim 1, further comprising the steps of:

receiving at the gaming machine a feature signal from a network device; and at least one of:

initiating said game feature on said gaming machine;

ending said game feature on said gaming machine; and evaluating a current state of the one or more feature attributes in said game played on said gaming machine to determine a participation status to a special feature.

16. The method of claim 1, wherein the step of modifying the feature attribute comprises at least one of:

activating the feature attribute associated with the evaluated evaluation structure;

deactivating the feature attribute associated with the evaluated evaluation structure;

modifying a numeral value associated with the feature attribute associated with the evaluated evaluation structure; and modifying the nature of the feature attribute, wherein the nature of the feature attribute influences the payout criteria against which the evaluation structure is evaluated.

17. A non-transitory computer readable medium embodying a computer program having codes configured to execute a game feature comprising:

a) generating a game outcome on a gaming machine comprising:

i—a game structure defining a plurality of locations;

ii—a plurality of symbols, each symbol being disposed in one of the locations according to the game structure;

iii—two or more evaluation structures used to evaluate the game outcome and to establish payout values each individually associated with one of the evaluation structures;

iv—each evaluation structure, distinct from the other evaluation structures, being individually associated with a subset of the game structure locations; and v—one or more feature attributes each individually and separately assigned to one of the evaluation structures, the feature attributes persisting over one or more subsequently-generated game outcomes;

b) evaluating the game outcome comprising:

i—evaluating the game outcome against payout criteria, comprising:

a—identifying two or more evaluation structures for use in evaluating the game outcome against payout criteria, defining two or more payout-evaluated structures;

b—for each of the two or more payout-evaluated evaluation structures, evaluating the game outcome against payout criteria based on the subset of locations associated with the two or more payout-evaluated evaluation structures;

c—for each positive evaluation, establishing the payout value associated with the payout-evaluated evaluation structure; and d—for each evaluation structure associated with one of the feature attributes, modifying the payout value according to the feature attribute assigned thereto;

and ii—evaluating the game outcome against feature criteria different from said payout criteria, comprising:

a—identifying one or more evaluation structures among the one or more evaluation structures having a feature attribute assigned thereto to be used to evaluate the game outcome against feature criteria, defining one or more feature-evaluated evaluation structures;

b—for each of the one or more feature-evaluated evaluation structures, evaluating the game outcome against feature criteria based on the subset of locations associated with the one or more feature-evaluated evaluation structures; and c—for each positive evaluation against feature criteria, modifying and replacing the feature attribute assigned to the feature-evaluated evaluation structure, the modified and replaced feature attribute persisting over one or more subsequently-generated game outcomes;

and c) awarding the payout values established during the step of evaluating the game outcome to the player on the gaming machine.

* * * * *

UNITED STATES PATENT AND TRADEMARK OFFICE

CERTIFICATE OF CORRECTION

PATENT NO. : 7,959,505 B2
APPLICATION NO. : 11/602996
DATED : June 14, 2011
INVENTOR(S) : Gérald Duhamel It is certified that error appears in the above-identified patent and that said Letters Patent is hereby corrected as shown below:

Title Page
Line (60) as appearing in Patent Application Publication US 2007/0270207 is missing and should read:

"Related US. Application Data
(60) Provisional application no. 60/738,603, filed on Nov. 22, 2005."

Signed and Sealed this
Eighteenth Day of October, 2011

David J. Kappos
*Director of the United States Patent and Trademark Office*